United States Patent [19]

Wiik

[11] 4,101,628
[45] Jul. 18, 1978

[54] METHOD FOR MANUFACTURING THERMOPLASTIC ARTICLES

[76] Inventor: Tor Wiik, Vestervik Stromsvik, 65290 Vaasa 29, Finland

[21] Appl. No.: 718,159

[22] Filed: Aug. 27, 1976

Related U.S. Application Data

[63] Continuation of Ser. No. 515,816, Oct. 18, 1974, abandoned.

[51] Int. Cl.² ................................................ B29F 5/00
[52] U.S. Cl. ................................ 264/325; 264/210 R; 264/294; 264/323; 264/327
[58] Field of Search .................. 264/294, 327, 210 R, 264/320, 323, 325

[56] References Cited

U.S. PATENT DOCUMENTS

| | | | |
|---|---|---|---|
| 2,781,547 | 2/1957 | Moxness | 264/327 |
| 3,079,642 | 3/1963 | Needham | 264/294 |
| 3,608,058 | 9/1971 | Coffman | 264/327 X |
| 3,739,052 | 6/1973 | Ayres | 264/148 X |

*Primary Examiner*—Richard R. Kucia
*Attorney, Agent, or Firm*—Toren, McGeady and Stanger

[57] ABSTRACT

Thermoplastic objects are manufactured by placing an extruded thermoplastic blank while still in a substantially molten state within a mold cavity defined on all sides by rigid walls with at least one of the walls being movable relative to the other walls. The movable wall extends substantially completely over the entire area of one side of the article to be formed and it is moved to apply pressure to the article while also simultaneously applying heat to the one side against which the wall is pressed. The other walls forming the mold cavity are cooled during the forming process.

1 Claim, 3 Drawing Figures

METHOD FOR MANUFACTURING THERMOPLASTIC ARTICLES

This is a continuation of application Ser. No. 515,816 filed Oct. 18, 1974, now abandoned.

This invention relates to the moulding of shaped objects manufactured from thermoplastic material, as ehtylene polymer, and similar materials with corresponding characteristics, especially moulding of annular pipe stub ends.

In the manufacture of such shaped objects, substantially molten thermoplastic material is compressed into a mould to form the desired shaped object, which is then normally cooled rapidly from all surfaces. As cooling begins, a tough hard skin forms on all outer surfaces of the object. Voids, which may contain air or other gases at pressure less than atmospheric pressure, are formed due to shrinkage of the ethylene polymer during cooling. As the molten polymer cools, the object solidifies and the voids, which tend to remain in the liquid phase of the polymer, move towards the centre of the object. During this process, the voids tend to coalesce to form larger voids. In the case of the manufacture of stub ends for large diameter pipe, large voids aligned annularly in the thickest portion of the stub ends may be formed. Voids so aligned may severely weaken, and may even result in failure of, the stub ends.

Canadian Pat. No. 660,737, issued on Apr. 2, 1963, to Bialy et al. discloses one method of preparing void-free solid blocks of ethylene polymer. This method consists of extruding molten ethylene polymer into a mould; removing the ethylene polymer from the mould and placing it in an aluminium container of corresponding shape. The container is immediately placed in an insulated enclosure preheated initially to a temperature 5 to 10° F above the crystallization point of the ethylene polymer so as to obtain slow cooling of the ethylene polymer and a minimum temperature gradient between inner and outer portions of the ethylene polymer when it reaches its crystallization temperature. Using this method, the entire block of ethylene polymer may be solidified into a void-free block.

This prior art method has the disadvantages that the entire block of molten polymer must be placed in an insulated enclosure and that a long period of time is required to impart to the block of ethylene polymer the desired solid shape.

It is an object of the present invention to provide a method of moulding void-free shaped objects of thermoplastic material, as ethylene polymer, which overcomes the above disadvantages.

In accordance with the present invention, therefore, there is provided an improved method for moulding from thermoplastic material shaped objects, the invention comprising the steps of:

(1) extruding a substantially molten bar of thermoplastic material;
(2) placing the still substantially molten bar in a mould;
(3) compressing the bar by applying pressure to at least one outer surface of the shaped object;
(4) cooling the shaped object in the mould for a predetermined period; and simultaneously,
(5) heating of that surface of the object to which pressure is applied.

For a more detailed description of the method according to the present invention, reference is made to the following description in conjunction with the accompanying drawings in which FIG. 1 is a plan view of part of an annular mould for making large diameter stub ends from thermoplastic material;

Figure 1:
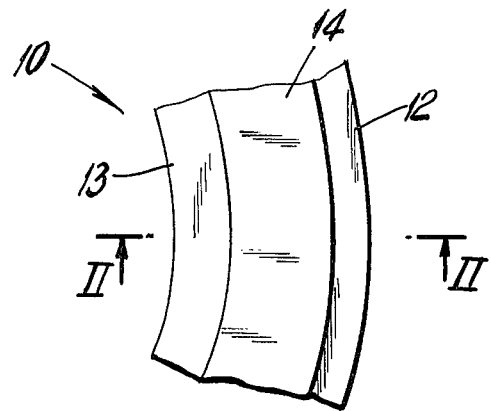
Figure 2:
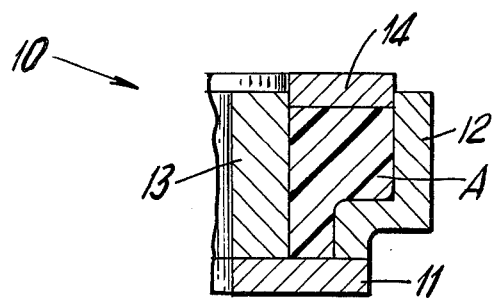
FIG. 2 is section II—II of the mould of FIG. 1.

In FIG. 1 and FIG. 2 of the drawings, annular mould 10 comprises an annular base plate 11; an outer annular side wall 12; an inner annular side wall 13 and a removable annular top pressure plate 14. Means are provided for cooling the base plate 11, and the lower surface of outer side wall 12. Compressing means is also provided for applying e.g. hydraulic pressure to the top of pressure plate 14.

In making substantially void-free stub ends of thermoplastic material using the mould of FIG. 1, the annular top pressure plate 14 is first removed from the mould 10. A bar (usually cylindrical) of polymer is extruded from a typical extruder and cut to a length corresponding to about 3.14 times the diameter for the pipe stub end. Immediately, the still substantially molten bar is placed in the annular opening between side wall 12 and 13 of the mould 10. Top pressure plate 14 is placed over the bar and pressure is applied to the pressure plate to compress the still substantially molten bar in the mould 10 to form the stub end A. While maintaining pressure on the top of pressure plate 14 the base plate 11 and outer side wall 12 are cooled, e.g. with a flow of cooling water and this is continued for a predetermined cooling period, preferably one hour.

Simultaneously the pressure plate 14 is heated which may take place in any suitable way, e.g. electrically by providing resistance wires in that surface of the pressure plate which is directed against the object, or by directing a number of gas burners or the like against the upper surface of the pressure plate, which last mentioned method has proven itself very convenient. The burners can be provided in a vertically adjustable stand above the plate 14.

By this method the whole plate 14 will thus be heated and consequently also the whole surface of the object against which pressure is applied. At the same time a tough skin forms on those surfaces of the object which are cooled, the thickness of which however near the pressure plate 14 is less than that of the cooled surfaces otherwise.

This skin formation sets the outer shape of the object along the cooled surfaces whereas the inner part of the object is still in a heated state. As the cooling front moves inwardly towards the middle of the object shrinkages appear in the middle part and voids will then form very easily therein as no material can flow from the sides and prevent the above mentioned voids from forming. In order to prevent voids from being formed heated material must be supplied in order to compensate the volume reduced through shrinkage. According to the invention this takes place by applying pressure to that surface of the object which is simultaneously heated and which in the example shown rests against the pressure plate 14.

The pressure against the pressure plate 14 is so adjusted that it corresponds to the shrinkage in the middle of the object. Should, contrary to all expectation, voids form these are closed by the pressure of the pressure plate 14 and the supplied heat which allows the material by flowing to fill up possible voids. Possible air or gas in the material can rise through the mass not yet solidified and depart along the edges of the pressure plate 14. In order that this should happen as freely as possible the pressure and the heat is applied to that surface or those surfaces which are situated rather close to the parts of the object where there is risk for void formation.

Even if it is most practicable that the cover 14 on the mould is used as a heated pressure plate, it is also possible to choose for this purpose the base plate or one or more of the side walls of the mould. Also the pressure plate 14 may be heated while simultaneously supplying heat to some of the sidewalls of the mould, and cooling other parts.

Figure 3:
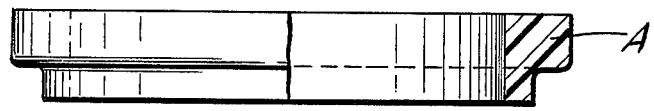
FIG. 3 is view partly in section of a completed polymer stub end which has been made in the mould of FIG. 1.

Instead of only one pressure plate also several plates may be used, e.g. the cooling plate 11 of the example may be displacable in relation to the sidewalls 12 and 13 of the mould, and be provided with either cooling or heating means. The pressure plate 14 and the possible additional pressure plate may consist of several separate parts, if desired, but it should also then rather precisely cover the whole surface of the object against which pressure is applied. At the final stage of the cooling, the heating, the cooling and the pressure are switched off and the stub end is removed from the mould 10. After further cooling at ambient temperature the stub end is finished by machining at least one side thereof. A finished stub end is shown in FIG. 3.

I claim:

1. A method for manufacturing objects of thermoplastic material comprising the steps of providing an extruded blank of thermoplastic material from which an object is to be formed, placing said extruded blank while still in a substantially molten state within a mold cavity defined on all sides thereof by a plurality of rigid walls totally enclosing said mold cavity, with at least one of said walls being movable relative to the other of said walls, said at least one movable wall extending substantially completely over the entire area of the side of said mold cavity defined by said at least one movable wall, displacing said at least one movable wall inwardly of said mold cavity to apply pressure to said blank along the side thereof contiguous with the side of said mold cavity defined by said at least one movable wall, said pressure being thereby applied over substantially the entire area of said contiguous side of said blank, applying heat directly to said at least one movable wall simultaneously with said displacing thereof thereby to simultaneously apply to said contiguous side of said blank heat together with the pressure resulting from said displacing of said at least one movable wall, and cooling the other sides of said blank at the same time that said pressure and said heat are being simultaneously applied to said contiguous side.

* * * * *